US012366475B2

(12) United States Patent
Daufeld et al.

(10) Patent No.: US 12,366,475 B2
(45) Date of Patent: Jul. 22, 2025

(54) FILL LEVEL MEASUREMENT DEVICE

(71) Applicant: Endress+Hauser SE+Co. KG, Maulburg (DE)

(72) Inventors: Ghislain Daufeld, Village Neuf (FR); Arnd Kempa, Steinen (DE); Stefan Gorenflo, Hausen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 569 days.

(21) Appl. No.: 17/287,290

(22) PCT Filed: Sep. 16, 2019

(86) PCT No.: PCT/EP2019/074713
§ 371 (c)(1),
(2) Date: Apr. 21, 2021

(87) PCT Pub. No.: WO2020/088830
PCT Pub. Date: May 7, 2020

(65) Prior Publication Data
US 2021/0396568 A1    Dec. 23, 2021

(30) Foreign Application Priority Data
Oct. 30, 2018   (DE) .................. 10 2018 127 012.7

(51) Int. Cl.
G01F 25/20    (2022.01)
G01F 23/284   (2006.01)

(52) U.S. Cl.
CPC ............ *G01F 25/20* (2022.01); *G01F 23/284* (2013.01)

(58) Field of Classification Search
CPC .............................. G01F 23/284; G01F 25/20
See application file for complete search history.

(56) References Cited

U.S. PATENT DOCUMENTS

| 10,436,178 B2 * | 10/2019 | Hales ...................... F03D 7/028 |
| 2004/0118181 A1 * | 6/2004 | Kathan .................. G05G 1/015 |
| | | 73/1.88 |

(Continued)

FOREIGN PATENT DOCUMENTS

| CN | 102812337 A | 12/2012 |
| CN | 102822643 A | 12/2012 |

(Continued)

*Primary Examiner* — Vladimir Magloire
(74) *Attorney, Agent, or Firm* — Mark A. Logan; Endress+Hauser (USA) Holding, Inc.

(57) ABSTRACT

Disclosed are methods for checking the operational reliability of a radar-based fill level measurement device, which operates according to the pulse time-of-flight method. The methods include detecting controlled variables of the fill level measurement device, such as the signal amplification or the sampling rate. By comparing the controlled variable with a corresponding limit value, it can be determined whether the fill level measurement device is operationally reliable or whether the operational reliability of the fill level measurement device has been lost with increasing operating times because of the degradation of electrical components. It is also advantageous that, on the basis of the methods according to the invention, it is possible to make a prediction according to the principle of "predictive maintenance" regarding how much remaining operating time is estimated to be left until a possible functional failure of the fill level measurement device.

10 Claims, 3 Drawing Sheets

(56) References Cited

U.S. PATENT DOCUMENTS

| | | | |
|---|---|---|---|
| 2012/0056628 A1* | 3/2012 | Michalski | G01F 23/284 |
| | | | 324/629 |
| 2013/0205052 A1* | 8/2013 | Eyraud | G06F 11/0775 |
| | | | 710/57 |
| 2016/0047684 A1* | 2/2016 | Gorenflo | G01F 23/2962 |
| | | | 73/290 V |
| 2017/0276536 A1* | 9/2017 | Malinovskiy | G01S 7/35 |
| 2017/0370762 A1 | 12/2017 | Karimian-Sichany et al. | |
| 2018/0031687 A1 | 2/2018 | Mueller et al. | |

FOREIGN PATENT DOCUMENTS

| | | | | |
|---|---|---|---|---|
| DE | 10007187 A1 * | 8/2001 | | G01F 23/284 |
| DE | 0955528 B1 * | 11/2006 | | G01F 23/284 |
| DE | 102005049500 A1 | 5/2007 | | |
| DE | 102012108462 A1 * | 3/2014 | | G01F 23/0061 |
| DE | 102015122057 B3 * | 7/2017 | | G01B 11/026 |
| DE | 102017100269 A1 | 7/2018 | | |
| DE | 102018104926 A1 * | 9/2019 | | F02D 41/1401 |
| WO | 0102819 A1 | 1/2001 | | |
| WO | 2016202533 A1 | 12/2016 | | |
| WO | 2017222905 A1 | 12/2017 | | |

* cited by examiner

FILL LEVEL MEASUREMENT DEVICE

CROSS-REFERENCE TO RELATED APPLICATIONS

The present application is related to and claims the priority benefit of German Patent Application No. 10 2018 127 012.7, filed on Oct. 30, 2018 and International Patent Application No. PCT/EP2019/074713, filed on Sep. 16, 2019, the entire contents of which are incorporated herein by reference.

TECHNICAL FIELD

The invention relates to methods for checking the operational reliability of a fill level measurement device.

BACKGROUND

In process automation technology, field devices for detecting or modifying process variables are used. For this purpose, the functioning of the field devices is in each case based on suitable measuring principles in order to capture the corresponding process variables, such as fill level, flow rate, pressure, temperature, pH value, redox potential, or conductivity. A wide variety of such field devices is manufactured and distributed by the Endress+Hauser company.

For measuring the fill level of filling materials in containers, radar-based measuring methods have become established since they are robust and require minimum maintenance. Within the scope of the invention, the term "container" also refers to containers that are not closed, such as basins, lakes, or flowing bodies of water. A key advantage of radar-based measuring methods lies in their ability to measure the fill level quasi-continuously. In the context of this patent application, the term "radar" refers to signals or electromagnetic waves having frequencies between 0.03 GHz and 300 GHz.

In the case of radar-based fill level measurement, the pulse time-of-flight method is an established measuring principle. Microwave pulses are emitted cyclically at a defined clock rate in the direction of the filling material, and the time of flight until the correspondingly reflected microwave pulse is received is measured.

In order to determine the time of flight or the fill level, a corresponding evaluation signal is recorded on the basis of the received, reflected microwave pulses. Due to the high pulse frequency, the evaluation signal is generated by undersampling the reflected microwave pulses. The undersampling is carried out by mixing the reflected microwave pulses with corresponding generated sampling pulses, the sampling rate of which deviates by a defined ratio from the clock rate of the emitted microwave pulses. In order to ensure that this defined target phase change between the sampling rate and the clock rate is adhered to, the sampling rate is readjusted by a control loop as a function of the measured relation. Overall, the evaluation signal thus represents the signal amplitude of the reflected microwave pulses in a time-expanded manner. The evaluation signal reflects the signal amplitude of the reflected microwave pulses as a function of the measurement distance.

Based on the pulse time-of-flight method, fill level measurement devices can be implemented with comparatively low circuitry complexity and a high fill level resolution in the sub-millimeter range. A radar-based fill level measurement device which operates according to the time-of-flight method is described, for example, in the unexamined patent application DE 10 2012 104 858 A1.

In addition to freely radiating radar measurement, in which the microwave pulses are emitted or received via an antenna, the variant of guided radar also exists. In this case, the microwave pulses are guided via an electrically conductive probe (for example, a coaxial cable or a metal rod) which is lowered into the container. At the location of the filling material surface, the microwave pulses are reflected in the probe and conducted back along the probe toward the fill level measurement device. This variant of radar-based fill level measurement is also known by the term TDR (time-domain reflectometry). This variant is advantageous in that due to the guided signal radiation, less power is required for operating the fill level measurement device. Analogously to freely radiating radar devices according to the pulse time-of-flight method, an evaluation signal for ascertaining the fill level is also generated when implementing the TDR principle. Regardless of whether free radiation or guided radar is used, the fill level is determined by detecting and locally allocating the corresponding local signal maximum in the evaluation signal.

The operational reliability of the device electronics of the fill level measurement device may be lost with increasing operating times due to internal aging effects or due to outside environmental influences. This can be caused, for example, by detuning of oscillators, by a decrease in the capacitance of capacitors, or by impedance changes in amplifier circuits. This can be problematic, on the one hand, if it is not discernible from the outside that the fill level is no longer correctly detected. This may cause critical states in the process plant, such as overfilling of the container. On the other hand, an unexpectedly occurring functional failure of the fill level measurement device can lead to long standstill times of the process plant, as a result of which the operator may incur considerable financial damage.

SUMMARY

The object of the invention is therefore to provide a fill level measurement device whose operational reliability can be checked.

The invention achieves this object by a method for checking the operational reliability of a radar-based fill level measurement device which is used to measure the fill level of a filling material located in a container. The method comprises the following method steps:
  emitting microwave pulses in a clocked manner in the direction of the filling material at a defined clock rate;
  receiving reflected microwave pulses after reflection at the surface of the filling material;
  generating an evaluation signal by sampling the received microwave pulses at a defined sampling rate;
  measuring a ratio of the clock rate to the sampling rate; and
  adjusting the ratio to a target ratio by regulating the sampling rate by means of a first controlled variable in relation to the target ratio such that the ratio corresponds to the target ratio.

According to the invention, the fill level measurement device is rated as operationally reliable, provided that the first controlled variable does not exceed or fall below a defined first limit value.

Analogously to this method, the object underlying the invention is achieved by a further method which is used to check the operational reliability of a radar-based fill level measurement device, the fill level measurement device being used to measure the fill level of a filling material located in a container. This method comprises the following method steps:

emitting microwave pulses in a clocked manner in the direction of the filling material at a defined clock rate;
receiving reflected microwave pulses after reflection at the surface of the filling material;
generating an evaluation signal by sampling the received microwave pulses at a defined sampling rate; and
measuring an amplitude and/or an amplitude offset of the evaluation signal, the amplitude and/or the amplitude offset being regulated by means of a second controlled variable or a third controlled variable.

In this method, the fill level measurement device is rated as operationally reliable, provided that the second controlled variable and/or the third controlled variable do not exceed or fall below a defined second limit value or a third limit value.

The methods are based on the finding according to the invention that the instantaneous operational reliability of the fill level measurement device can be assessed based on the values of various controlled variables since sufficient readjustment is no longer possible, depending on the control loop, when a malfunction exists at one of the electronic components.

Another advantage of the methods according to the invention is that the fill level measurement device itself can check its operational reliability so as to be able to indicate this in the case of doubt or report this to a higher-level process control center.

Based on the methods according to the invention, a prediction according to the principle of "predictive maintenance" can additionally be made as to how much remaining operating time is left until a possible functional failure of the fill level measurement device, provided that the fill level measurement device is currently still operationally reliable. For this purpose, in the case of the method mentioned first, a first change function of the first controlled variable is ascertained over progressing fill level measurement cycles, provided that the first controlled variable does not exceed the first limit value. A remaining operating time until the first limit value is reached can thus be calculated on the basis of the current first controlled variable and on the basis of the first change function.

Analogously to this, in the case of the second method for generating a failure prediction over progressing fill level measurement cycles, a second change function of the second controlled variable, or a third change function of the third controlled variable, can be ascertained, provided that the second or third controlled variable does not exceed the second limit value or third limit value. In this case as well, a remaining operating time until reaching the second or third limit value can be calculated on the basis of the current, second or third controlled variable and on the basis of the respective change function. A suitable function type of the first change function, the second change function, and/or the third change function may be ascertained by means of the least squares method, for example. This can also be carried out by the fill level measurement device itself.

Since the controlled variables within the fill level measurement device often depend not only on the operational reliability of specific components but also on the temperature at the fill level measurement device, it may be advantageous within the scope of the invention if a temperature is measured at the fill level measurement device, and if the first limit value, the second limit value, and/or the third limit value are defined as a function that is dependent on the temperature.

Correspondingly to the methods according to the invention, the object underlying the invention is achieved by a radar-based fill level measurement device which is designed to carry out at least one of the methods according to one of the preceding embodiment variants. For this purpose, the fill level measurement device comprises the following components:

a pulse generating unit designed to generate high-frequency electrical pulses at a defined clock rate;
a transceiver unit designed to
emit the high-frequency pulses as microwave pulses in the direction of the filling material, and
receive the reflected microwave pulses after reflection at the surface of the filling material;
a sampling unit designed to generate electrical sampling pulses at a defined sampling rate;
a mixer designed to
mix the received microwave pulses with the sampling pulses in such a way that an evaluation signal is generated, and/or
control an amplitude offset of the evaluation signal;
a detector designed to measure a ratio of the sampling rate of the sampling pulses to the clock rate of the high-frequency pulses; and
an evaluation unit designed to
adjust the ratio to the target ratio by regulating the sampling rate by means of the first controlled variable in relation to the target ratio such that the ratio corresponds to the target ratio, and/or
measure the amplitude or the amplitude offset of the evaluation signal, the amplitude and/or the amplitude offset being compensated by means of a second controlled variable or a third controlled variable in the evaluation signal,
determine the fill level on the basis of the evaluation signal, and
rate itself as not operationally reliable, provided that the first controlled variable, the second controlled variable, or the third controlled variable exceeds or falls below the corresponding limit value.

The evaluation unit can additionally be designed in such a way that a potential lack of operational reliability is transmitted to a higher-level unit.

Within the scope of the invention, the term "unit" shall, in principle, be understood to mean an electronic circuit that is suitably designed for its intended purpose. Depending on the requirement, it can therefore be an analog circuit for generating or processing corresponding analog signals. However, it can also be a (semiconductor-based) digital circuit, such as an FPGA or a storage medium in interaction with a program. In this case, the program is designed to carry out the corresponding method steps or to apply the necessary calculation operations of the respective unit. In this context, various electronic units of the fill level measurement device in the sense of the invention can potentially also access a common physical memory or be operated by means of the same physical digital circuit.

BRIEF DESCRIPTION OF THE DRAWINGS

The invention is explained in more detail with reference to the following figures. The following is shown.

DETAILED DESCRIPTION

Figure 1:
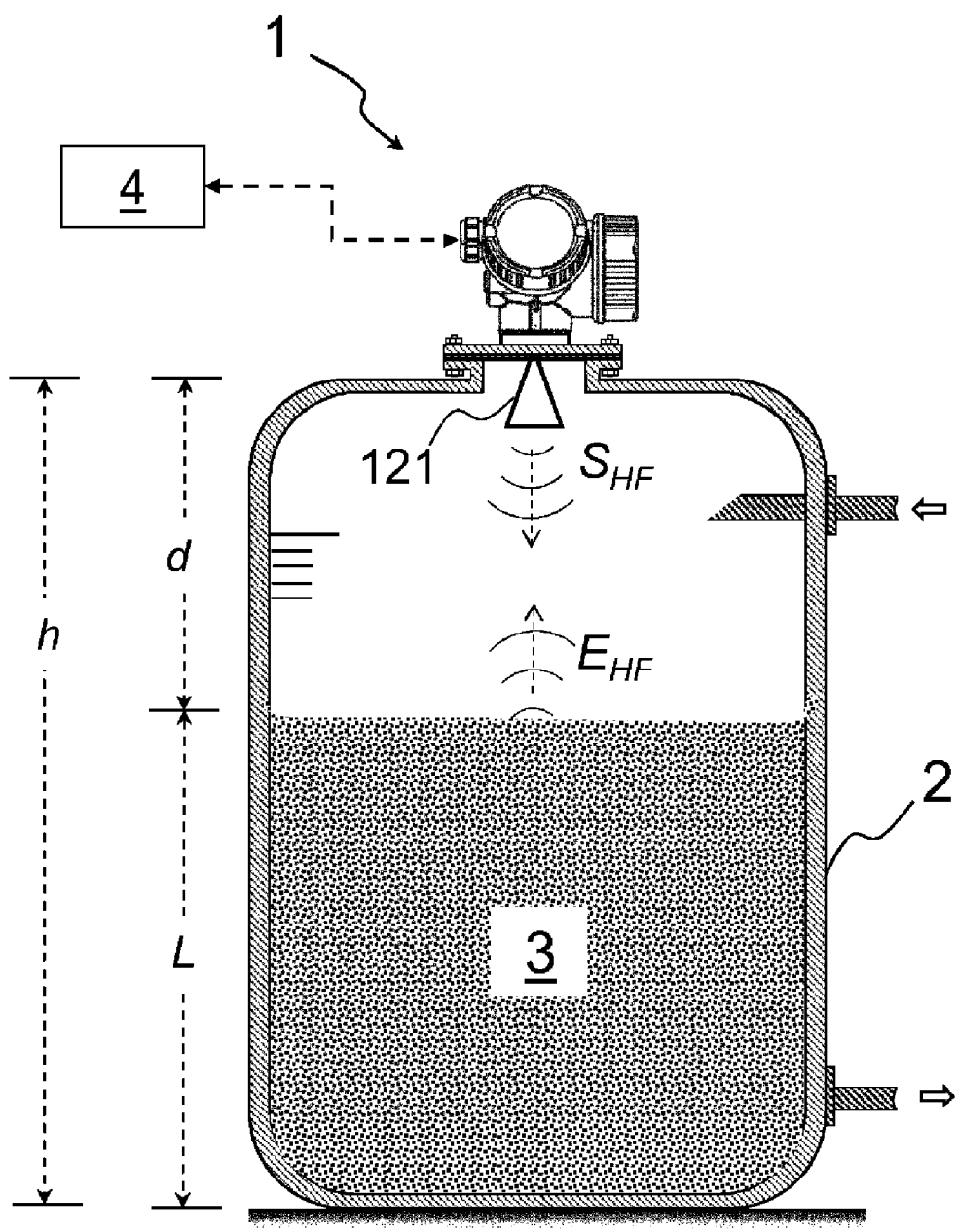
FIG. 1 shows a typical arrangement of a radar-based fill level measurement device.

For a basic understanding of the invention, FIG. 1 shows a typical arrangement of a freely radiating, radar-based fill level measurement device 1 on a container 2. In the container 2 is a filling material 3, whose fill level L is to be determined by the fill level measurement device 1. For this purpose, the fill level measurement device 1 is mounted on the container 2 above the maximum permissible fill level L. Depending on the field of application, the height h of the container 2 can be up to 125 m.

As a rule, the fill level measurement device 1 is connected via a bus system, such as "Ethernet," "PROFIBUS," "HART," or "Wireless HART," to a higher-level unit 4, such as a process control system or a decentralized database. On the one hand, information about the operating status of the fill level measurement device 1 can thus be communicated. On the other hand, information about the fill level L can also be transmitted via the bus system in order to control any inflows or outflows that may be present at the container 2.

Since the fill level measurement device 1 shown in FIG. 1 is designed as freely radiating radar, it comprises a corresponding antenna 121. As indicated, the antenna 121 can be designed as a horn antenna, for example. Regardless of the design, the antenna 121 is oriented in such a way that corresponding microwave pulses $S_{HF}$ are emitted in the direction of the filling material 3 according to the pulse time-of-flight method.

The microwave pulses $E_{HF}$ are reflected at the surface of the filling material 3 and, after a corresponding signal time-of-flight, are received as electrical reception signals $e_{HF}$ at the antenna 121. The signal time-of-flight of the microwave pulses $S_{HF}$, $E_{HF}$ depends on the distance d=h−L of the fill level measurement device 1 from the filling material surface.

Figure 2:
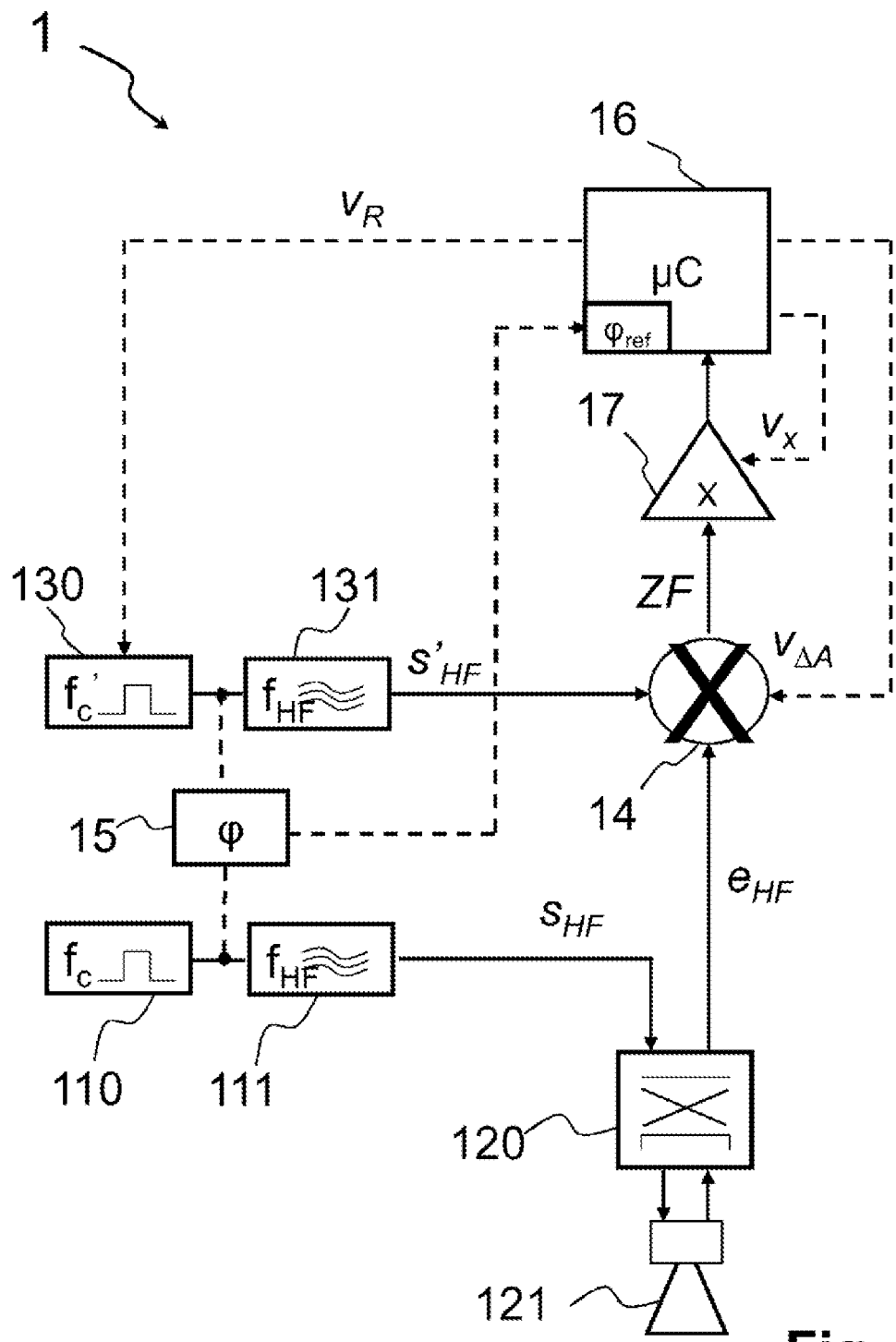
FIG. 2 shows a circuit design of the fill level measurement device.

A circuit design of the fill level measurement device 1 with which the microwave pulses $S_{HF}$ can be generated and with which the fill level L can be determined on the basis of the electrical reception signals $e_{HF}$ is shown in FIG. 2:

In order to generate the microwave pulses $S_{HF}$, the circuit of the fill level measurement device 1 shown in FIG. 2 comprises a pulse generating unit. The pulse generating unit is designed to generate high-frequency electrical pulses $s_{HF}$ at a defined clock rate $f_c$. For this purpose, the pulse generating unit in the shown exemplary embodiment comprises a first pulse generator 110, which actuates a first high-frequency oscillator 111. The frequency of the microwave pulses $S_{HF}$, $E_{HF}$ is established by the oscillation frequency of the high-frequency oscillator 111. In the simplest case, the high-frequency oscillator 111 can be designed as an oscillating crystal. A VCO (voltage-controlled oscillator) can also be used. In this case, the high-frequency oscillator 111 is actuated by the pulse generator 110 by means of a DC voltage signal. The pulse generator 110 thereby defines the pulse duration of the individual microwave pulses $S_{HF}$ and the clock rate $f_c$ at which the microwave pulses $S_{HF}$ are emitted. As standard, a semiconductor-based digital resonant circuit is used as the high-frequency oscillator 111. In practice, the clock rate is between 100 KHz and 1 MHz.

The high-frequency pulses $s_{HF}$ thereby generated by the high-frequency oscillator 111 are supplied to the antenna 121 via a duplexer 120 so that they are correspondingly emitted as microwave pulses $S_{HF}$. Since the reflected microwave pulses $E_{HF}$ are additionally received via the antenna 121, the duplexer 120 supplies the corresponding electrical reception signal $e_{HF}$ to a mixer 14.

In contrast to the shown embodiment variant, an electrically conductive probe, such as a waveguide or a coaxial cable, which extends toward the container bottom can be used instead of the antenna 121. In contrast to the circuit shown in FIG. 2, in the implementation of this embodiment variant known by the term TDR (time-domain reflectometry), the high-frequency oscillators 111, 131 are not required.

By means of the mixer 14, the undersampling of the reception signal $e_{HF}$ characteristic of the pulse time-of-flight method is carried out. For this purpose, the reception signal $e_{HF}$ is mixed with electrical sampling pulses $s'_{HF}$ by the mixer 14. In the process, the sampling rate $f'_c$ at which the sampling pulses $s'_{HF}$ are generated deviates by a defined, low ratio φ of much less than 0.1 per thousand from the clock rate $f_c$ of the generated high-frequency pulses $s_{HF}$. Depending on the type of the mixer 14, it can be designed such that a potential amplitude offset ΔA of the evaluation signal ZF can be set or compensated by means of a corresponding second control signal $v_{A4}$. Depending on the design of the mixer 14, an analog voltage or current signal or a digital signal is to be applied as the second control signal $v_{A4}$. In the circuit of the fill level measurement device 1 shown in FIG. 2, the amplitude offset ΔA of the evaluation signal ZF at the mixer 14 is regulated by an evaluation unit 16.

The sampling pulses $s'_{HF}$ are generated by a sampling unit, which analogously to the pulse generating unit, comprises a second pulse generator 130 and second high-frequency oscillator 131. Thus, correspondingly to the high-frequency pulses $s_{HF}$, the frequency $f_{HF}$ of the sampling pulses $s'_{HF}$ is defined by the second high-frequency oscillator 131. The second pulse generator 130 controls the sampling rate $f'_c$ at which the sampling pulses $s'_{HF}$ are generated.

For the correct determination of the fill level L on the basis of the evaluation signal ZF, it is essential for the sampling rate $f'_c$ of the sampling unit to correspond exactly to its target sampling rate: This means that the relation φ to clock rate $f_c$ of the pulse generating unit corresponds to a required target relation $φ_{ref}$. In order to ensure that the sampling rate $f'_c$ does not drift therefrom, it is accordingly regulated. In the exemplary embodiment shown in FIG. 2, the regulation takes place by a detector 15, which measures the ratio (p of the clock rate $f_c$ to the sampling rate $f'_c$ downstream of the first pulse generator 110 or the second pulse generator 130. This can be technically implemented, for example, by the detector 15 measuring, over a plurality of phases, a change in the time shift between the positive edge at the first pulse generator 110 and the positive edge at the second pulse generator 130.

From the change in the time shift, the evaluation unit 16 calculates the ratio φ of the clock rate $f_c$ to the sampling rate $f'_c$. The evaluation unit 16 additionally adjusts the ascertained ratio φ of the clock rate of $f_c$ to the sampling rate $f'_c$ to a stored target ratio $φ_{ref}$. This allows the evaluation unit 16 to regulate the sampling rate $f'_c$ at the second pulse generator 130 as a function of the measured ratio φ in such a way that the ratio φ coincides with the target ratio $φ_{ref}$, of, for example, 1.0001.

In the embodiment variant shown in FIG. 2, the evaluation unit 16 regulates the second pulse generator 130 by means of a corresponding first control signal $v_R$. Depending on the design of the second pulse generator 130, the first control signal $v_R$ can again be an analog voltage or current signal or a digital signal.

By mixing the reception signal $e_{RF}$ with the electrical sampling pulses $s'_{HF}$ by means of the mixer 14, an evaluation signal ZF is generated, which represents the reception signal $e_{HF}$ in a time-expanded manner. In the process, the time expansion factor changes proportionally to the ratio φ of the clock rate $f_c$ to the sampling rate $f'_c$.

The advantage of the time expansion is that the evaluation signal ZF can be evaluated considerably more easily from a technical point of view due to the time expansion in comparison with the pure reception signal $e_{HF}$: The reason for this is that the reception signal $e_{HF}$, due to the high speed of propagation of the microwave pulses $S_{HF}$, $E_{HF}$ at the speed of light, has an accordingly short time scale in the nanosecond range. As a result of the time expansion, the evaluation signal ZF is given a time scale between 100 kHz and 5 MHz.

In order to adjust the evaluation signal in terms of the level, an amplifier 17 is arranged between the mixer 14 and the evaluation unit 16 in the shown exemplary embodiment in order to adapt the signal amplitude A of the evaluation signal ZF as a whole. The regulation can again be carried out by the evaluation unit 16 in that the amplification factor x is readjusted as a function of the evaluation signal ZF detected by the evaluation unit 16. As an alternative or in addition to an external regulation of the amplitude gain x or of the amplitude offset ΔA by means of the amplifier 17 or by means of the mixer 14, the evaluation unit 16 can also be designed to correct the evaluation signal ZF only internally or digitally by the amplitude gain x or the amplitude offset ΔA, without external readjustment of the incoming evaluation signal ZF taking place.

Figure 3:
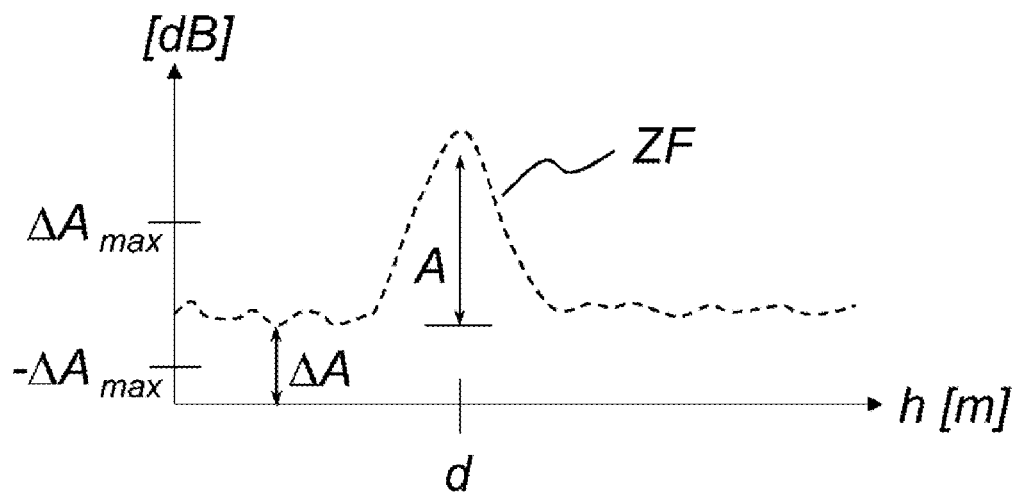
FIG. 3 shows an evaluation curve generated by the fill level measurement device.

A schematic evaluation curve ZF is shown in FIG. 3: The evaluation unit 16 of the fill level measurement device 1 determines the fill level L on the basis of the evaluation signal ZF in that the evaluation unit 16 ascertains the maximum of the evaluation signal ZF which was caused by the surface of the filling material 3 (for illustration, only this amplitude maximum is shown in the schematic evaluation signal ZF illustrated in FIG. 3). After the maximum has been ascertained, the distance d corresponding to the maximum is determined. Thus, the evaluation unit 16 can determine the fill level L according to the relationship L=h−d.

As the operation of the fill level measurement device 1 continues, the risk of individual components of the respective circuit units 11, 12, 13, 14, 15, 16, 17 degrading increases. For example, oscillators 111, 131 may be detuned, impedances may change, or capacitances of capacitors may decrease. Depending on the circuit unit 11, 12, 13, 14, 15, 16, 17, this can result in either an erroneous evaluation curve ZF being generated or no evaluation curve ZF being able to be generated at all. In both cases, the fill level measurement device 1 is thus no longer operationally reliable.

The idea according to the invention for checking the operational reliability is based on assessing the operational reliability of the fill level measurement device 1 on the basis of the first controlled variable $v_R$, the second controlled variable $v_x$, or the third controlled variable $v_{AA}$: If none of the controlled variables $v_R$, $v_x$, $v_{AA}$ exceeds or falls below a corresponding, previously defined limit value $v_{R,max}$, $v_{x,mas}$, $v_{AA,max}$, the fill level measurement device 1 is rated as operationally reliable. In the process, the checking can be carried out by the evaluation unit 16, i.e., the fill level measurement device 1 itself, by measuring the value of the respective controlled variable $v_R$, $v_x$, $v_{AA}$ (for example as a voltage value or as a binary value in the present case) and comparing it to the corresponding limit value $v_{R,max}$, $v_{x,mas}$, $v_{AA,max}$. If the evaluation unit 16 detects that the limit value $v_{R,max}$, $v_{x,mas}$, $v_{AA,max}$ has been exceeded or fallen below, depending on the sign of the limit value $v_{R,max}$, $v_{x,mas}$, $v_{AA,max}$, and thus detects the lack of operational reliability, the evaluation unit 16 can, for example, report this to the higher-level unit 4.

Since the controlled variables $v_R$, $v_x$, $v_{AA}$, in addition to a potential degradation of the electrical components 11, 12, 13, 14, 15, 16, 17, are also dependent on the temperature at the fill level measurement device 1, it is advantageous in those cases if the respective limit values $v_{R,max}$, $v_{x,mas}$, $v_{AA,max}$ are defined as a function that is dependent on the temperature and are stored in the evaluation unit 16. In this case, the evaluation unit 16 is to be equipped with a corresponding temperature sensor, so that, on the basis of the temperature-dependent function and the currently measured temperature, the respectively suitable limit value $v_{R,max}$, $v_{x,mas}$, $v_{AA,max}$ can be used to assess the operational reliability.

The method according to the invention can also be developed in such a way that a prediction can be made as to when the fill level measurement device 1 is expected to no longer be operationally reliable. A precondition for this is that the limit value $v_{R,max}$, $v_{x,mas}$, $v_{AA,max}$ is currently not yet exceeded, i.e., the fill level measurement device 1 is still operationally reliable at present. Such a prediction can be used to be able to schedule maintenance or a replacement of the fill level measurement device 1 at an early stage on the part of the plant operator according to the principle of "predictive maintenance."

It is possible to calculate an anticipated remaining operating time Δt until a lack of operational reliability occurs in that the evaluation unit 16, over progressing fill level measurement cycles, i.e., with increasing operating time of the fill level measurement device 1, continuously records at least one of the controlled variables $v_R$, $v_x$, $v_{AA}$ and, based thereon, ascertains a corresponding change function $dv_R/dt$, $dv_x/dt$, $dv_{AA}/dt$ of the respective controlled variable $v_R$, $v_x$, $v_{AA}$. On the basis of the value of the current controlled variable $v_R$, $v_x$, $v_{AA}$ and on the basis of the respective change function $dv_R/dt$, $dv_x/dt$, $dv_{AA}/dt$, the evaluation unit 16 is able to calculate a corresponding remaining operating time Δt until the first limit value $v_{R,max}$, $v_{x,max}$, $v_{AA,max}$ is likely reached. In the event that for two or all of the controlled variables $v_R$, $v_x$, $v_{AA}$, a different remaining operating time Δt is calculated, the evaluation unit 16 can, for example, define the shortest of the ascertained remaining operating times Δt as the applicable remaining operating time Δt.

Figure 4:
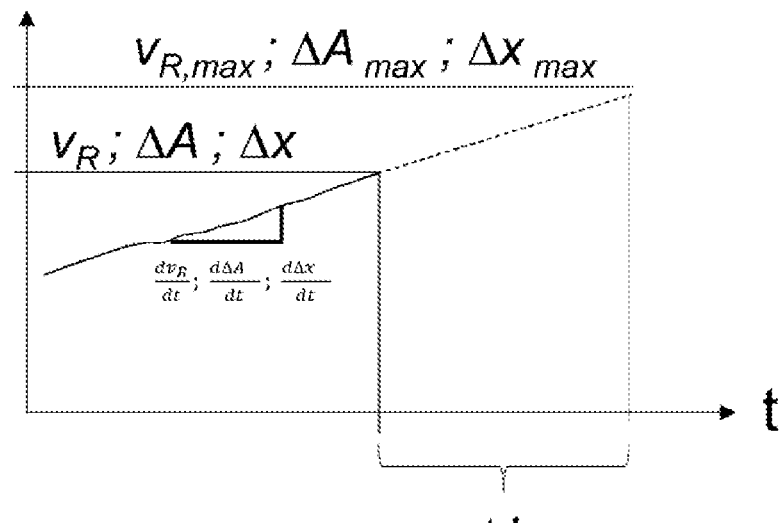
FIG. 4 shows a calculation of the remaining operating time of the fill level measurement device.

The determination of the remaining operating time Δt is shown schematically in FIG. 4: For illustrative purposes, an approximately linear increase in the controlled variable $v_R$, $v_x$, $v_{AA}$ is shown with increasing operating time of the fill level measurement device 1. Accordingly, a linear function can be used in FIG. 4 as the function type of the change function $dv_R/dt$, $dv_x/dt$, $dv_{AA}/dt$ in the exemplary embodiment shown. In general, the change function $dv_R/dt$, $dv_x/dt$, $dv_{AA}/dt$, however, can possibly not be optimally approximated by a linear function so that, for example, a polynomial function supplies an improved approximation to the progression of the respective controlled variable $v_R$, $v_x$, $v_{AA}$ over the past measurement cycles. Accordingly, the evaluation unit 16 can be programmed, for example, in such a way that it ascertains a suitable function type of the corresponding change function $dv_R/dt$, $dv_x/dt$, $dv_{AA}/dt$ by means of the least squares method. In this way, the remaining operating time Δt can be predicted with even greater precision.

LIST OF REFERENCE SIGNS

1 Fill level measurement device
2 Container
3 Filling material
4 Higher-level unit
14 Mixer
15 Detector
16 Evaluation unit
17 Amplifier
110 First pulse generator
111 First high-frequency oscillator
120 Duplexer
121 Antenna
130 Second pulse generator
131 Second high-frequency oscillator
A Amplitude
d Distance
$E_{HF}$ Reflected microwave pulses
$e_{HF}$ Reception signal
$f_c$ Clock rate
$f'_c$ Sampling rate
$f_{HF}$ Frequency of microwave pulses
h Installation height
L Fill level
$S_{HF}$ Microwave pulses
$s_{HF}$ High-frequency pulses
$s'_{HF}$ Sampling pulses
$v_R$ First controlled variable
$v_x$ Second controlled variable
$v_{\Delta A}$ Third controlled variable
$v_{R,max}$ First limit value
$v_{x,max}$ Second limit value
$v_{\Delta A,max}$ Third limit value
ZF Evaluation signal
ΔA Amplitude offset
Δt Remaining operating time
φ Ratio of the clock rate to the sampling rate
$φ_{ref}$ Target ratio
$dv_R/dt$ First change function
$dv_x/dt$ Second change function
$dv_{\Delta A}/dt$ Third change function

The invention claimed is:

1. A method for checking the operational reliability of a radar-based fill level measurement device which is used to measure a fill level of a filling material located in a container, the method comprising:
emitting microwave pulses in a clocked manner in a direction of the filling material at a defined clock rate;
receiving reflected microwave pulses after reflection at a surface of the filling material;
generating an evaluation signal by sampling the received microwave pulses at a defined sampling rate;
measuring a ratio of the clock rate to the sampling rate;
adjusting the ratio to a target ratio by regulating the sampling rate via a controlled variable in relation to the target ratio such that the ratio corresponds to the target ratio;
measuring a value of the controlled variable;
rating the fill level measurement device as operationally reliable when the controlled variable does not exceed or fall below a defined limit value; and
rating the fill level measurement device as not operationally reliable when the controlled variable exceeds or falls below the defined limit value.

2. The method according to claim 1, further comprising:
when the controlled variable does not exceed the limit value, ascertaining a rate of change of the controlled variable over progressing fill level measurement cycles; and
calculating, based on a current value of the controlled variable and on the rate of change of the controlled variable, a remaining operating time until the limit value is reached.

3. A method for checking the operational reliability of a radar-based fill level measurement device which is used to measure a fill level of a filling material located in a container, the method comprising:
emitting microwave pulses in a clocked manner in a direction of the filling material at a defined clock rate;
receiving reflected microwave pulses after reflection at a surface of the filling material;
generating an evaluation signal by sampling the received microwave pulses at a defined sampling rate;
measuring an amplitude and/or an amplitude offset of the evaluation signal, the amplitude being regulated via a first controlled variable and the amplitude offset being regulated via a second controlled variable;
measuring a value of the first controlled variable and measuring a value of the second controlled variable;
rating the fill level measurement device as operationally reliable when the first controlled variable does not exceed or fall below a defined first limit value and/or the second controlled variable does not exceed or fall below a defined second limit value; and
rating the fill level measuring device as not operationally reliable when the first controlled variable exceeds or falls below the defined first limit value and/or the second controlled variable exceeds or falls below the defined second limit value.

4. The method according to claim 3, further comprising:
when the first controlled variable does not exceed the first limit value, ascertaining a rate of change of the first controlled variable over progressing fill level measurement cycles; and
calculating, based on a current value of the first controlled variable and on the rate of change of the first controlled variable, a remaining operating time until the first limit value is reached.

5. The method according to claim 3, further comprising:
when the second controlled variable does not exceed the second limit value, ascertaining a rate of change of the second controlled variable over progressing fill level measurement cycles; and
calculating, based on a current value of the second controlled variable and on the rate of change of the second controlled variable, a remaining operating time until the second limit value is reached.

6. The method according to claim 4, wherein the rate of change of the first controlled variable is ascertained via a least squares method.

7. The method according to claim 5, wherein the rate of change of the second controlled variable is ascertained via a least squares method.

8. The method according to claim 3, further comprising:
measuring a temperature at the fill level measurement device,
wherein the first limit value and/or the second limit value are defined as a temperature-dependent function.

9. A radar-based fill level measurement device, comprising:
a pulse generating unit designed to generate high-frequency electrical pulses at a defined clock rate;

a transceiver unit designed to:
  emit the high-frequency pulses as microwave pulses in a direction of a filling material; and
  receive reflected microwave pulses after reflection at a surface of the filling material;
a sampling unit designed to generate electrical sampling pulses at a defined sampling rate;
a mixer designed to:
  mix the received microwave pulses with the sampling pulses to generate an evaluation signal; and
control an amplitude offset of the evaluation signal;
a detector designed to measure a ratio of the sampling rate of the sampling pulses to the clock rate of the high-frequency pulses;
an amplifier connected with an output of the mixer and configured to control an amplitude of the evaluation signal; and
an evaluation unit designed to:
  adjust the ratio to a target ratio by regulating the sampling rate via a first controlled variable in relation to the target ratio such that the ratio corresponds to the target ratio;
measure the amplitude or the amplitude offset of the evaluation signal, the amplitude being regulated via a second controlled variable and the amplitude offset being regulated via a third controlled variable;
determine the fill level on the basis of the evaluation signal;
measuring a value of the first controlled variable, measuring a value of the second controlled variable, and measuring a value of the third controlled variable;
rate the radar-based fill level measurement device as operationally reliable when the first controlled variable, the second controlled variable, and the third controlled variable do not exceed or fall below a corresponding limit value; and
rate the radar-based fill level measurement device as not operationally reliable when the first controlled variable, the second controlled variable, or the third controlled variable exceeds or falls below the corresponding limit value.

10. The radar-based fill level measurement device according to claim 9,
  wherein the evaluation unit is designed to transmit a potential lack of operational reliability to a higher-level unit.

* * * * *